United States Patent [19]

Yoshino et al.

[11] Patent Number: 4,836,653
[45] Date of Patent: Jun. 6, 1989

[54] FERROELECTRIC LIQUID CRYSTAL CELL AND ITS MANUFACTURING METHOD

[75] Inventors: Katsumi Yoshino, Kishiwada; Yasuhiro Shigeno, Ashiya, all of Japan

[73] Assignee: Hosiden Electronics Co., Ltd., Osaka, Japan

[21] Appl. No.: 224,280

[22] Filed: Jul. 26, 1988

Related U.S. Application Data

[63] Continuation of Ser. No. 861,217, May 9, 1986, abandoned.

[30] Foreign Application Priority Data

May 27, 1985 [JP] Japan ................................. 60-114478

[51] Int. Cl.[4] .............................................. G02F 1/13
[52] U.S. Cl. .................................. 350/341; 350/350 S
[58] Field of Search ................... 350/350 S, 341, 334, 350/343

[56] References Cited

U.S. PATENT DOCUMENTS

| | | | |
|---|---|---|---|
| 3,787,110 | 1/1974 | Berreman et al. | 350/341 |
| 3,994,568 | 11/1976 | King et al. | 350/343 |
| 4,128,313 | 12/1978 | Cole et al. | 350/341 X |
| 4,367,924 | 1/1983 | Clark et al. | 350/334 |
| 4,563,059 | 1/1986 | Clark et al. | 350/350 S X |
| 4,634,228 | 1/1987 | Iwasaki et al. | 350/350 S X |

OTHER PUBLICATIONS

Kondo et al., "Practical Method of Preparing Thin Homogeneous Ferroelectric Smectic Cells for Electro-Optical Microsecond Switches: Alignment Control of Liquid Crystal Molecules by Utilizing Spacer Edges", JAP, J. of App. Phys., vol. 22, No. 2, Feb. 1983, pp. L85-L87.

Primary Examiner—Stanley D. Miller
Assistant Examiner—Anita E. Pellman
Attorney, Agent, or Firm—Pollock, Vande Sande and Priddy

[57] ABSTRACT

A method for the manufacture of a ferroelectric liquid crystal cell which includes ferroelectric liquid crystal sealed between a pair of opposed but spaced plates, each having formed on one surface a pattern of conductive layer, the plates being disposed with their conductive layers facing each other, comprises the step of rubbing the surfaces of the plates in at least two directions prior to the sealing of the ferroelectric liquid crystal.

8 Claims, 3 Drawing Sheets

FERROELECTRIC LIQUID CRYSTAL CELL AND ITS MANUFACTURING METHOD

This application is a continuation of Ser. No. 861,217, filed on May 9, 1986, now abandoned.

BACKGROUND OF THE INVENTION

The present invention relates to a liquid crystal cell and its manufacturing method. In particular, the invention pertains to a method whereby the surfaces of base plates of the ferroelectric liquid crystal cell are treated by rubbing to provide stable molecular orientation.

Heretofore there have been put into practical use TN (Twisted Numàtic) type, DSM (Dynamic Scattering Mode) type, and GH (Guest-Host) type liquid crystal cells which employ nematic liquid crystal. Optical switching elements utilizing these liquid crystal cells have found use in a variety of electro-optical applications such as displays, optical communications, printers, and laser-applied field.

The conventional elements or devices employing nematic liquid crystal, however, pose a problem in their response speed which is several milliseconds at the highest, and hence cannot be used in situations requiring fast response operations. For this reason the prior art liquid crystal cells have been limited to applications which do not call for high-speed response.

In recent years an entirely new type of liquid crystal cell has been proposed which utilizes ferroelectric liquid crystal. The ferroelectric liquid crystal cell is fast in response time and is now attracting attention as a most promising liquid crystal cell because it is suitable for high-speed display and many other electro-optical applications. The conventional nematic liquid crystal cells utilize the dielectric anisotropy for their driving. In contrast thereto, the ferroelectric liquid crystal cell utilizes a large torque PsE which is produced by the interaction between an electric field E and spontaneous polarization Ps; this permits high-speed operation of the ferroelectric liquid crystal cell.

The ferroelectric liquid crystal cell has been proposed by, for example, Iwasaki et al (Y. Iwasaki et al, Jpn. J. Appl. Phys., Vol. 18 (1979), No. 12, pp. 2323, hereinafter referred to as literature (1) and Clark et al (Clark et al, Appl. Phys. Lett., 36 (11), 1 June 1980, pp. 899, U.S. Pat. No. 4,367,924 issued on Jan. 11, 1983, hereinafter referred to as literature (2) In the ferroelectric liquid crystal cell, as shown in FIG. 1A, liquid crystal molecules 1 whose long axes are respectively tilted at an angle $+\theta$ and at angle $-\theta$ to the helix axis Y of the liquid crystal in a plane parallel to the cell plate surfaces are mixed together. Upon application of a voltage to the liquid crystal, the liquid crystal molecules 1 are all forced to be tilted at the angle $-\theta$ alone, as depicted in FIG. 1B, and they remain unchanged even after removal of the applied voltage. Reversing the polarity of the applied voltage, the liquid crystal molecules 1 are all forced to be tilted at the angle $+\theta$ alone, as shown in FIG. 1C, and their tilt direction remains unchanged even after removal of the voltage. Thus, the ferroelectric liquid crystal cell has two enforced molecular orientation directions, and these directions can be reversed by reversing the polarity of the externally applied field; further, it gives rise to variations in birefringence accordingly. The combined use of the ferroelectric liquid crystal cell and polarizers will permit arbitrary transmission and interception of light through utilization of the above phenomenon.

However, in the conventional ferroelectric liquid crystal cells the alignment technique used for their molecular orientation—the most important technique—does not work well. For instance, the ferroelectric liquid crystal cell proposed in the above-mentioned literature 1 is not in the least satisfactory in this respect. The liquid crystal cell of literature 2 performs the molecular orientation by slightly moving one cell plate relative to the other a plurality of times after introducing the liquid crystal into the cell, but such a method is not suited for mass-production and lacks stability and reproducibility of the orientation.

Recently Goodby et al have proposed to achieve a stable molecular orientation by coating each cell plate with a high molecular layer and rubbing its surface in one direction (J. W. Goodby et al, Ferroelectrics, 59, 1984, pp. 137, hereinafter referred to as literature (3). This method ensures stable molecular orientation in one direction; for example, previous rubbing of the plate surface in the direction $-\theta$ in FIG. 1 will produce stable molecular orientation when the liquid crystal molecules are tilted in that direction, as shown in FIG. 1B. However, the molecular orientation is not so stable when the liquid crystal molecules are tilted in the direction $+\theta$, as depicted in FIG. 1C. In this case, after removal of the applied voltage, the molecular tilt angle gradually varies and some molecules restore to the initial direction $-\theta$ shown in FIG. 1B.

As will be understood from the above, the prior art has failed to provide the stable molecular orientation function which is one of important factors for practical applications of the ferroelectric liquid crystal cell.

To sum up, molecular orientation by the application of a magnetic field, which is applicable to the nematic liquid crystal cell, is almost ineffective for the smectic liquid crystal cell having a thickness of less than several $\mu$m. The Clark et al method is theoretically possible but is not suited to mass-production and possesses the defect of poor stability. Furthermore, the combination of the high molecular layer coating and the one-direction rubbing creates stable molecular orientation in one direction but is unstable in other directions.

It is therefore an object of the present invention to provide a ferroelectric liquid crystal cell which has two stable molecular orientation directions and hence is suitable for practical applications and mass-production, and a method for the manufacture of such a ferroelectric liquid crystal cell.

SUMMARY OF THE INVENTION

According to the present invention, in the manufacture of a ferroelectric liquid crystal cell which includes ferroelectric liquid crystal disposed between a pair of opposed cell plates, each coated over the entire area of its inner surface with a conductive layer, at least one of the cell plates is surface-treated by rubbing for molecular orientation in desired directions and then the ferroelectric liquid crystal is sealed in the space defined by the opposed cell plates. In this instance, the number of directions for the rubbing treatment is at least two as whole for the cell.

That is to say, the rubbing treatment may be performed in at least two directions for only one cell plate, in at least two directions for both cell plate in a superposing relation, in one different direction for each cell plate , or in at least one same direction for both cell plates and at least one different direction for at least one of them.

At any rate, the number of directions for the rubbing treatment is generally two or three on the whole. In the case of rubbing treatment in two directions, it is preferred that the angle between the two directions be nearly twice the molecular tilt angle. In the case of rubbing treatment in three directions, the angle between adjacent directions may preferably be substantially equal to the molecular tilt angle. The rubbing treatment may also be performed on a high molecular material layer which is formed on at least one of the cell plates.

The ferroelectric liquid crystal cell of the present invention, in which two plates, each having formed on one surface thereof an electrode pattern of conductive layer, are disposed in adjacent but spaced relation, with their conductive layers facing each other, and ferroelectric liquid crystal is sealed in the space defined by the plates, is characterized in that the plates are surface treated by rubbing in at least two directions to enforce molecular orientation in those directions.

DESCRIPTION OF THE PREFERRED EMBODIMENTS

Figure 1:
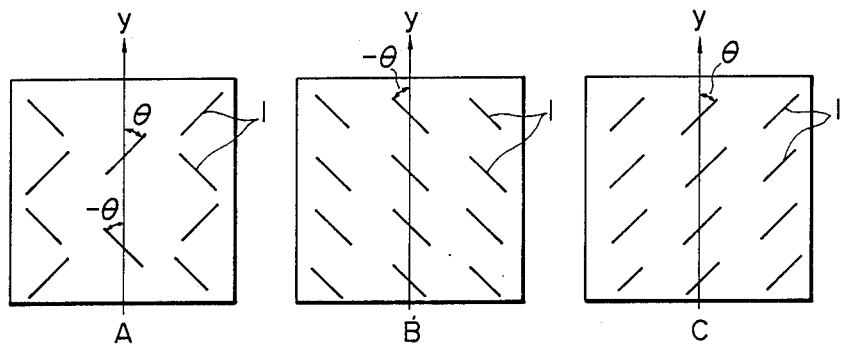
FIGS. 1A through 1C are schematic diagrams showing the relationships between ferroelectric liquid crystal molecules and their orientation.
Figure 2:
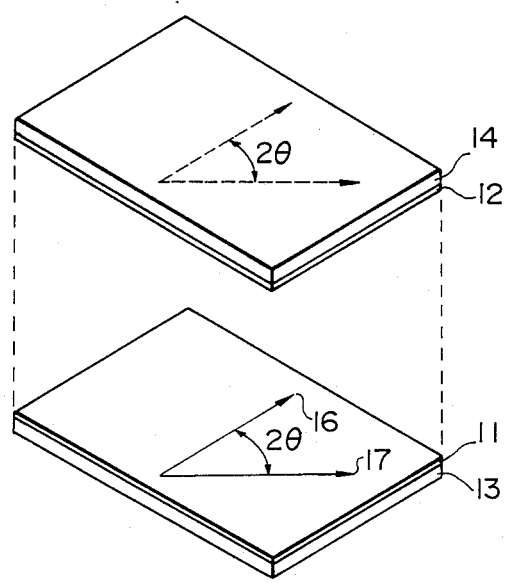
FIG. 2 is a perspective view of a pair of cell plates, showing an example of a two-direction rubbing treatment according to the manufacturing method of the present invention.
Figure 3:
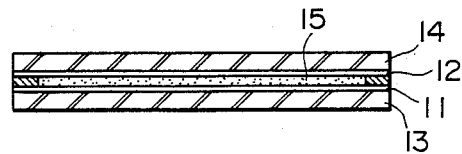
FIG. 3 is a cross-sectional view illustrating, by way of example a liquid crystal cell obtained by the manufacturing method of the present invention.

The ferroelectric liquid crystal cell of the present invention is identical in construction with conventional liquid crystal cells. A pair of plates 13 and 14 each having formed, on one surface, conductive layers 11 and 12 of desired patterns, respectively, as shown in FIG. 2, are assembled together in adjacent but spaced relation, with the conductive layers disposed inside or facing each other. Ferroelectric liquid crystal 15 is sealed in between the spaced conductive layers 11 and 12, as depicted in FIG. 3. According to the present invention, the plates 13 and 14 are surface treated by rubbing their conductive layers 11 and 12 in at least two directions as a whole prior to assembling the two plates into a cell.

One method for providing at least two molecular orientation directions is to rub the surface of the plate 13 in two directions 16 and 17 which make an angle $2\theta$ relative to each other, as depicted in FIG. 2. It is desirable that the angle $\theta$ be equal or nearly equal to the molecular tilt angle (a tilt angle of the molecular long axis with respect to a direction normal to a semitic layer) of the ferroelectric liquid crystal 15 in a liquid crystal cell operating temperature region; but the angle $\theta$ is not limited specifically to it. Ideally, the tilt angle $\theta$ is 22.5°, and in the case of implementing the ferroelectric liquid crystal cell as of the GH type in which dyes are mixed in the liquid crystal, the optimum tilt angle is 45°; but the tilt angle need not always be close to this value. The other plate 14 may or may not be subjected to the surface rubbing treatment. Where both plates 13 and 14 are surface treated, they are assembled into the cell so that the two rubbing directions 16 and 17 of one plate coincide with those of the other plate.

Figure 4:
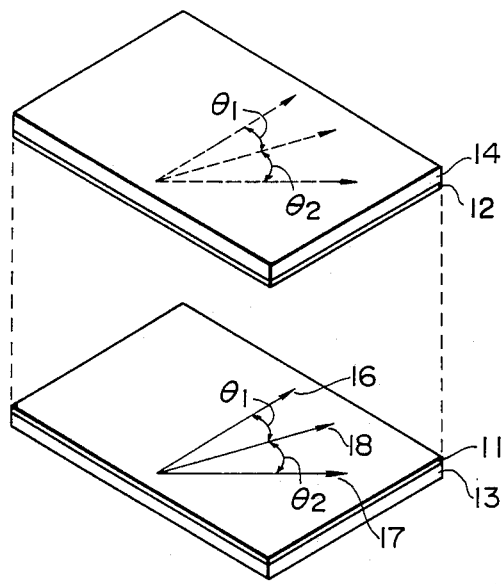
FIG. 4 is a perspective view of a pair of cell plates, showing an example of a three-direction rubbing treatment according to the manufacturing method of the present invention.

Another method is to rub the surface of the one plate 13 in three directions 16, 17 and 18, as shown in FIG. 4. In this instance, it is desirable that the angle $\theta_1$ between the directions 16 and 18 and the angle $\theta_2$ between the directions 17 and 18 be substantially equal to the molecular tilt angle, but they are not necessarily limited specifically to it. The idea of this three-direction surface rubbing treatment is based on the following phenomenon. Where the liquid crystal is sealed in the cell, it is often cooled from high temperatures, and since the liquid crystal assumes the nematic or semitic A phase at high temperatures, the molecular orientation could be improved by arranging the liquid crystal molecules in the same direction while they are in the nematic or semitic A phase. The rubbing in the intermediate direction 18 may sometimes be stronger than in the other directions 16 and 17, but this is not always necessary. This is aimed at achieving a higher degree of molecular orientation by bringing the molecular orientation direction into agreement with the intermediate rubbing direction 18 in the semitic A or nematic phase, that is, the normal to the smectic layer. Also in this instance, it is possible, as in the case of the above-mentioned method, to assemble the two plates 13 and 14 which are equally rubbed in the three directions, or the plate 13 rubbed in the three directions and the plate 14 which is not surface treated or rubbed in one or two directions. It is also possible to perform the three-direction rubbing, putting together the plates 13 and 14, as by rubbing the plate 13 in one direction 18 and the plate 14 in the two directions 16 and 17.

Figure 5:
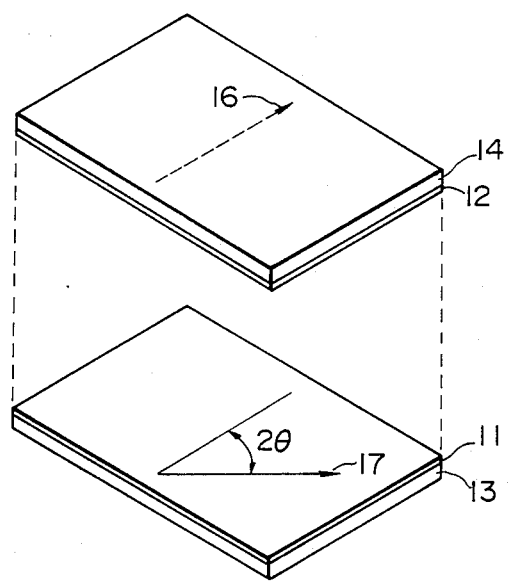
FIG. 5 is a perspective view of a pair of cell plates, illustrating another example of a two-direction rubbing treatment according to the manufacturing method of the present invention.

Still another method is to rub the surface of the plate 13 in one direction 17 and the surface of the other plate 14 in the other direction 16, as shown in FIG. 5, and assemble the two plates so that the angle between the directions 16 and 17 is equal to $2\theta$. It is desirable that the angle $\theta$ be equal or closed to the molecular tilt angle, but it is not limited specifically thereto.

That is, the present invention includes the rubbing treatment in at least two directions, and putting together the two plates 13 and 14.

The plate surface may be rubbed directly but may preferably be coated with a high molecular material layer before the surface rubbing. The plates 13 and 14 are formed from glass, synthetic resin, or inorganic semiconductor. The conductive layers 11 and 12 are each formed by a nesa film, a transparent electrode as of ITO, or conductive plastics. As the ferroelectric liquid crystal 15, various liquid crystals can be employed. The preferred values of the angles $\theta$, $\theta_1$ and $\theta_2$ are selected in accordance with the kind of the ferroelectric liquid crystal used.

To facilitate a better understanding of the present invention, a description will be given of examples of the invention.

EXAMPLE 1

An ITO layer was formed on a glass plate and coated with polyimide resin, and then the coated plate surface was rubbed in the two directions 16 and 17. The angle $2\theta$ between the two directions 16 and 17 was selected to be 45°. The rubbing was performed in the same manner, with the same strength and for the same period of time as those employed for the conventional nematic liquid crystal cell. Two such plates whose surfaces were rubbed in the two directions were assembled together into a cell of a 3 μm thickness, and then mixed ferroelectric liquid crystal of the ester series was sealed into the cell, obtaining a liquid crystal cell.

Figure 6:
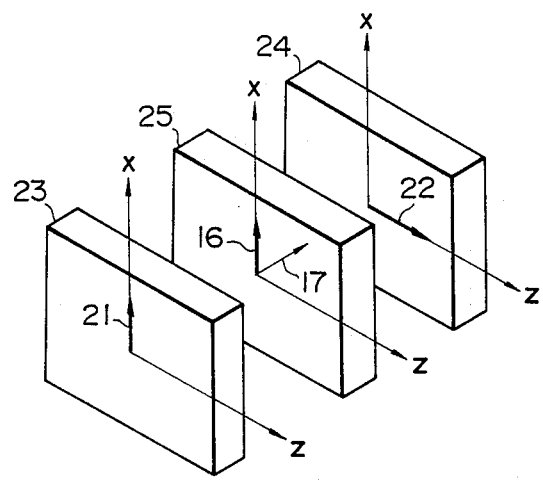
FIG. 6 is an exploded perspective view illustrating an example of an optical switching element utilizing the liquid crystal cell of the present invention.

The liquid crystal cell thus produced was applied to an optical switching element, as shown in FIG. 6, in which the liquid crystal cell, identified by 25, was disposed between two polarizers 23 and 24 whose polarization axes 21 and 22 perpendicularly intersect, and the rubbing direction 16 of the plates was held parallel to the polarization axis 21 of one polarizer 23. A visible ray (of a 550 nm wavelength) was transmitted through the optical switching element and 6 V was applied across the conductive layers 11 and 12. By reversing the polarity of the applied voltage, bright and dark states could be switched therebetween and a high contrast ratio (higher than 20) could be attained. As indicated by the curve 26 in FIG. 7, the bright and dark states were retained even after removal of the applied voltage; the contrast ratio was still as high as 3.7 after an hour elapsed. Furthermore, the bright and dark states could sufficiently be distinguished by the naked eye even after a one-day lapse.

Figure 7:
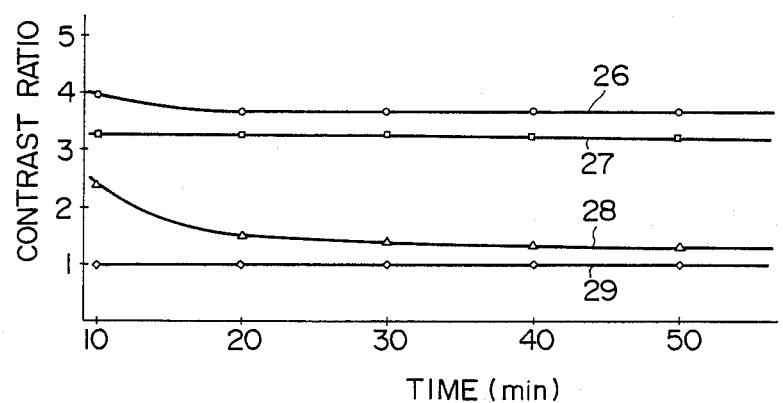
FIG. 7 is a graph showing how the contrast ratio varies with the lapse of time after removal of an applied voltage.

The curve 29 in FIG. 7 shows variations in the contrast ratio after removal of the applied voltage in the case where plates similar to those in the above example were employed but their surfaces were not rubbed at all. In this instance, the contrast ratio remains at 1 (no contrast) after removal of the voltage as well as during its application. Comparison of the curves 26 and 29 indicates that the liquid crystal cell of Example 1 is far more excellent than the liquid crystal cell mentioned just above.

EXAMPLE 2

The same plates as those in Example 1 were used and their surfaces were rubbed in the three directions 16, 17 and 18. The angle $\theta_1$ between the rubbing directions 16 and 18 and the angle $\theta_2$ between the rubbing directions 17 and 18 were each selected to 22.5°. A pair of such plates were assembled together into a 3 μm thick cell, with their three rubbing directions held in agreement with each other. Then mixed ferroelectric liquid crystal of the ester series was sealed in the cell, producing a liquid crystal cell. Its electro-optical characteristics were examined by the same method as in Example 1. High contrast (above 15) could be obtained by reversing the polarity of the applied voltage 6 V. As indicated by the curve 27 in FIG. 7, the bright and dark states were still maintained after removal of the applied voltage, and even after a one-hour lapse, the contrast ratio was 3.2 and the bright and dark states could fully be distinguished by the naked eye.

COMPARISON EXAMPLE

The surface of each of the same plates as those used in Example 1 was rubbed only in one direction and the two plates were assembled into a cell structure 3 μm thick, with their rubbing directions held in agreement with each other. Then mixed ferroelectric liquid crystal of the ester series was introduced into the cell structure, obtaining a liquid crystal cell. Its electro-optical characteristics were examined by the same method as employed in Examples 1 and 2. High contrast (above 20) was obtained by reversing the polarity of the applied voltage 6 V. In this case, however, contrast rapidly decreased upon removal of the applied voltage, as indicated by the curve 28 in FIG. 7. The contrast decreasing speed was far higher than in the cases of Examples 1 and 2; it was difficult to distinguish the contrast by the naked eye after an hour elapsed.

EXAMPLE 3

A 2 μm thick cell structure was prepared by combining a plate whose surface was rubbed in two directions by the same method as in Example 1 and a plate whose surface was not rubbed at all. DOBAMBC (P-decyloxybenzylidene p'-amino 2 methylbutyl cinnamato) was sealed, as the ferroelectric liquid crystal, into the cell structure, producing a liquid crystal cell. This liquid crystal cell appeared to the naked eye as if liquid crystal molecules were homogeneously distributed, but it was observed under a polarization microscope that liquid crystal molecules oriented in two directions were dispersed throughout the cell. Upon application of 8 V across the conductive layers 11 and 12 of the cell, one-direction molecular orientation was established immediately, and this molecular orientation remained unchanged for over an hour after removal of the applied voltage. When −8 V was applied next, the molecular orientation direction was switched to the other direction at once, and thismmolecular orientation direction was also sustained for a long time even after removal of the applied voltage.

EXAMPLE 4

The same plates as used in Example 1 were employed. The surface of one plate was rubbed in one direction and the surface of the other plate was rubbed in a different direction. A 2 μm thick cell structure was prepared by assembling the plates so that the angle $2\theta$ between their rubbing directions was 45°. DOBAMBC was sealed cell structure, obtaining a liquid crystal cell. It was observed under a polarization microscope that the liquid crystal molecules in this cell were rapidly oriented in response to an externally applied voltage, and excellent bistability was obtained in the molecular orientation, as in the case of Example 3.

Incidentally, the rubbing of the plate surface in Examples 2 to 4 and the Comparison Example was performed in the same manner as in Example 1. The strength of rubbing was a little changed according to direction, but the results were almost the same as mentioned above.

As described above, according to the present invention, rubbing of the plate surface ensures an excellent orientation of the ferroelectric liquid crystal and, further, reversing the polarity of an externally applied voltage produces two stable states, that is, enables bistable switching of the liquid crystal. The present invention provides a method for a bistable molecular orientation of the ferroelectric liquid crystal which has been difficult to accomplish in the past. Since such a bistable molecular orientation can be achieved simply by rubbing the plate surface or surfaces, this invention method is relatively easy perform and suited to mass-production.

It will be apparent that many modifications and variations may be effected without departing from the scope of the novel concepts of the present invention.

What is claimed is:

1. A ferroelectric liquid crystal cell having a bistable memory effect, comprising:

a pair of opposed but spaced plates, each having formed on one surface a pattern of conductive layer, the plates being disposed with their conductive layers facing each other; and ferroelectric liquid crystal sealed in between the opposed plates;

wherein one of said plates has had its said conductive layer subjected to a surface rubbing treatment in at least two directions, and either one of said plates has had its said conductive layer subjected to a surface rubbing treatment in at least one further direction different from said two directions, thereby subjecting said pair of plates to a surface rubbing treatment in three directions as a whole such that the angles between each two adjacent ones of said three rubbing directions are substantially equal to each other.

2. In a method for fabricating a ferroelectric liquid crystal cell having a bistable memory effect in which a pair of plates, each having one surface thereof coated with a conductive layers, are disposed in adjacent but spaced relation to one another with their conductive layers facing each other, ferroelectric liquid crystal cell is then cooled to cause a change in the phase of the liquid crystal, the improvement wherein a surface rubbing treatment is conducted in at least two directions on one of said plates and in at least one further direction different from said two directions on either one of said pair of plates thereby effecting three rubbing directions as a whole on said pair of plates prior to the sealing of the ferroelectric liquid crystal therebetween, said three directions being so selected that the angles between each two adjacent ones of the three rubbing directions are substantially equal to each other.

3. The fabrication method of claim 2 wherein only one of said plates is subjected to the surface rubbing treatment in said three directions.

4. The fabrication method of claim 2 wherein each of said two plates is subjected to the surface rubbing treatment in at least two of said three directions.

5. The fabrication method of claim 2 wherein the surface rubbing treatment in said three directions is to rub the surface of only one of the plates in one of said three directions and the surface of the other plate in at least the other two directions.

6. The fabrication method of claim 2 wherein the surface rubbing treatment in said three directions is to rub the surface of each of said plates in each of said three directions.

7. The fabrication method according to one of claims 2 to 6 wherein the angle between each two adjacent ones of the three rubbing directions is equal to the tilt angle of the ferroelectric liquid crystal molecules.

8. The fabrication method according to one of claims 2 to 6 wherein the plate or plates to be subjected to the surface rubbing treatment are each coated with a high molecular material layer for the surface rubbing treatment.

* * * * *